May 30, 1961

G. MINCHENKO 2,986,274

CAPACITOR BURN-OUT TEST SET

Filed April 3, 1957

Inventor
G. MINCHENKO

By W.C. Parnell
A. Horney

May 30, 1961  G. MINCHENKO  2,986,274
CAPACITOR BURN-OUT TEST SET
Filed April 3, 1957  2 Sheets-Sheet 2
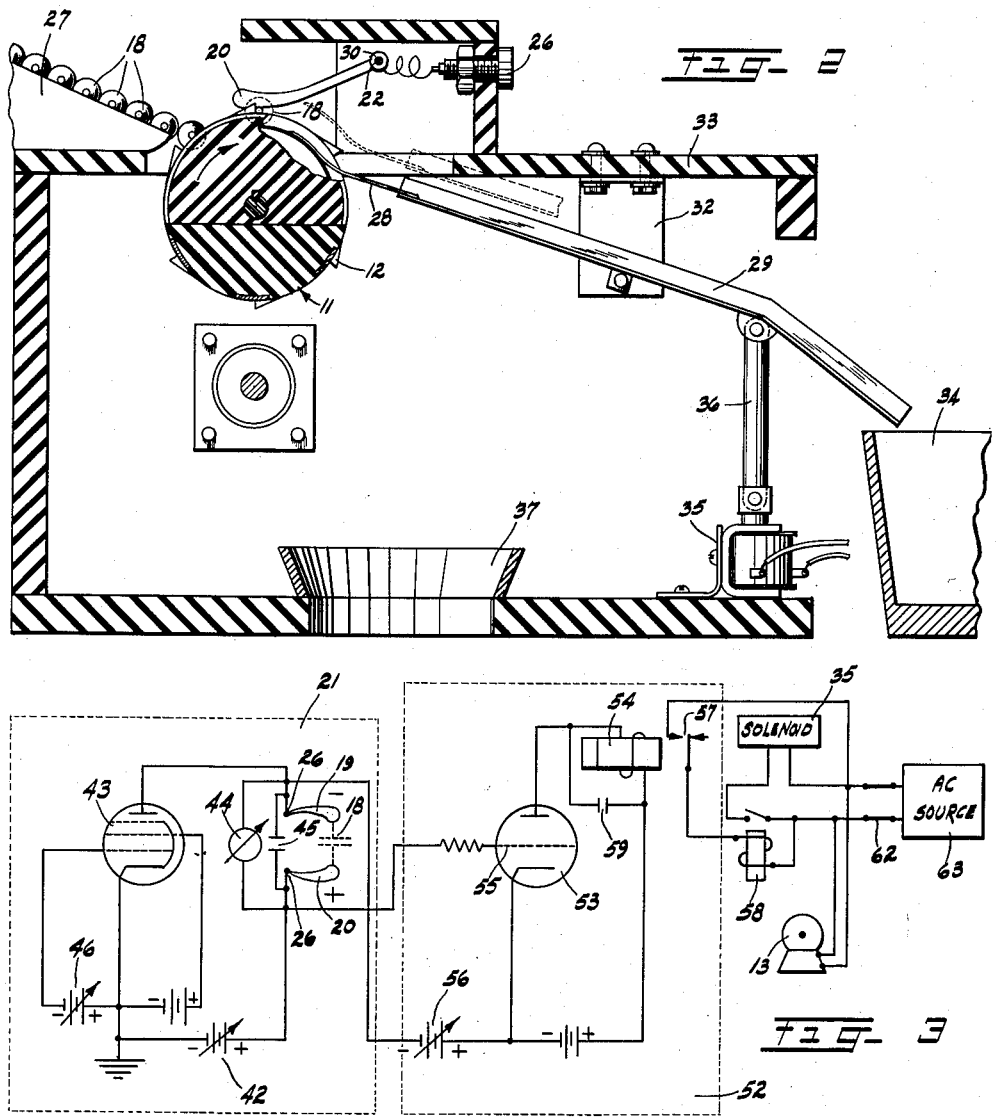
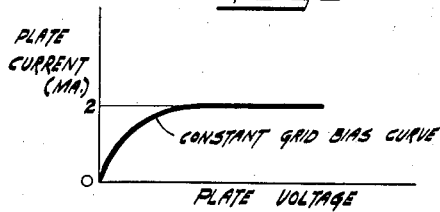

United States Patent Office 2,986,274
Patented May 30, 1961

2,986,274

CAPACITOR BURN-OUT TEST SET

George Minchenko, Salem, N.H., assignor to Western Electric Company, Incorporated, New York, N.Y., a corporation of New York Filed Apr. 3, 1957, Ser. No. 650,487

5 Claims. (Cl. 209—81)

This invention relates to the automatic testing of capacitors and particularly to overvoltage or burn-out testing of dry electrolytic or metallized-paper type capacitors.

In the fabrication of the aforementioned types of capacitors tiny conductive particles become embedded in the dielectric material and tend to short-circuit adjacent electrode layers. Such defects create a danger of capacitor failure when specified working voltages are applied thereto. It is common practice to clear these actual and latent defects by subjecting the completed capacitors to burn-out or overvoltage tests. This burn-out operation involves applying a gradually increasing test potential across the capacitor so that the current through the faults will create sufficient heat to burn away or vaporize the short circuiting particles and the metal foil of the electrodes surrounding the particles. In the past, difficulty has been experienced in preventing excessive currents through the faults which would cause overheating and ruin the capacitors.

The object of this invention is a test set for automatically clearing such defects without overheating the capacitors.

Another object is to automatically segregate satisfactorily-cleared capacitors from those that remain defective after a specified test period.

In general, when a capacitor to be tested is connected in the test circuit, the initial current through the capacitor is limited to a safe value and, as defects are burned out and its leakage resistance increases, the current is non-uniformly reduced so that the internal temperature rise is held within safe limits.

In a preferred embodiment of the invention, capacitors are successively fed to a test position for a timed test period, where test potential is applied through a device such as a non-linear electron discharge device which regulates and limits the current during the burn-out period. As the faults are cleared, the leakage resistance of the capacitor and the potential thereacross increases greatly and rapidly, and the impedance of the device increases non-linearly as the potential therever decreases until a specified test potential is applied across the capacitor. The non-linear current characteristics of the regulating device make it possible to limit automatically the I²R or internal heat generation in the capacitor to a safe value and thereby prevent damaging the capacitor when its leakage resistance undergoes a large change from a short circuiting value to a very high one. If the specified test potential is reached during the test period, a second electron discharge device controlled by the first, passes sufficient current to actuate a sorting mechanism for passing or accepting the tested capacitor when it is released from the test position.

In a preferred embodiment of a fixture for such a test set, an intermittently driven drum is provided with retention teeth for receiving capacitors and single feeding them to the test station where the terminal leads or pigtails thereof are forced under a pair of electrodes across which the test potential is applied. The driven drum is stopped for the predetermined test period while the test potential is applied to the capacitor. In the event the voltage across the capacitor builds up to the specified level during the test period, a pivotally mounted deflector member is moved away from its normal position alongside the drum to permit the good capacitor to drop through an aperture in the bottom of the fixture when the drum is moved to feed the next capacitor into the test station. If the voltage across the tested capacitor fails to build up, the deflector remains adjacent the drum and when the drum is moved, the tested capacitor is deflected into a reject receptacle.

These and other features of the invention will be more fully understood from the following detailed description, taken in conjunction with the accompanying drawing, in which:

Fig. 2 is a view of the test fixture along the plane of line 2—2, as seen in Fig. 1;

Fig. 3 is a schematic diagram of a preferred embodiment of a test circuit for the test set, and Fig. 4 shows a typical characteristic curve for a pentode-type electron tube utilized in the test circuit.

Figure 1:
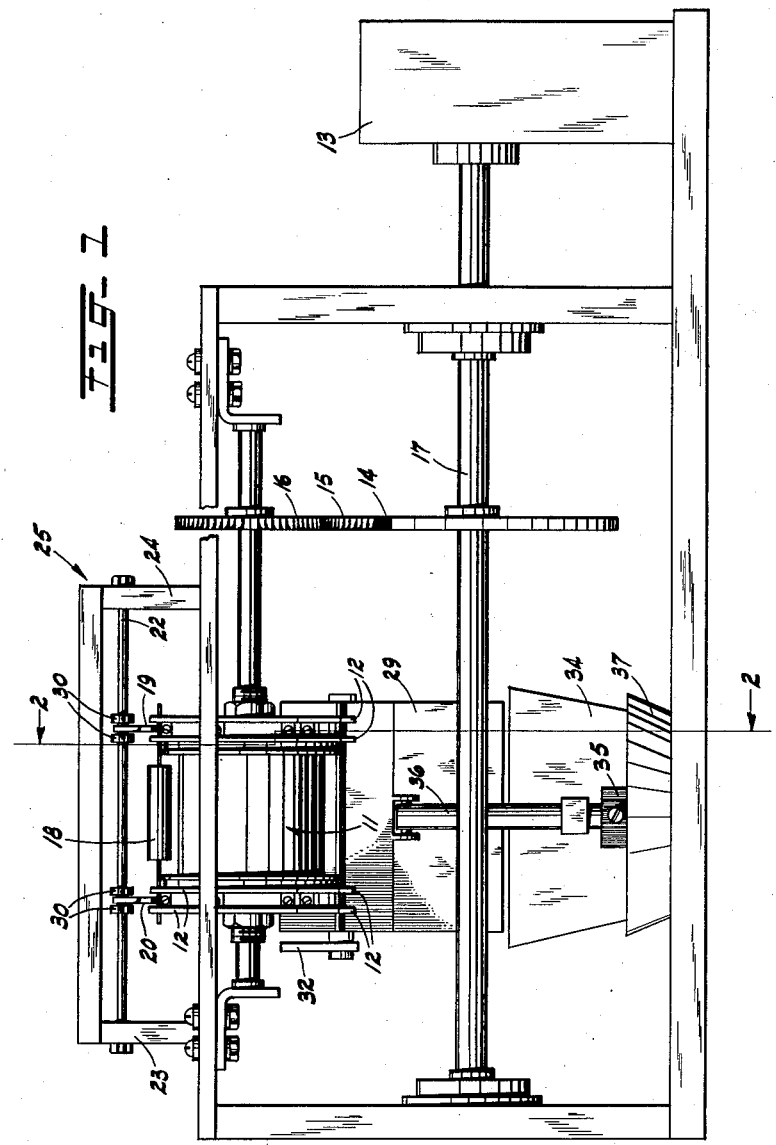
Fig. 1 is a side elevational view of the test fixture of the present invention.

Referring now to the drawing, the opposite ends of a drum 11 have six pairs of equally spaced retention teeth 12 extending radially therefrom for supporting capacitors 18 longitudinally along the drum. The drum is made of insulating material so that the leads of the capacitors 18 are electrically isolated. The drum is driven intermittently through a gear train by a six revolutions-per-minute motor 13 such that it is moved one-sixth of a revolution every ten seconds. This intermittent movement may be obtained with a conventional Geneva movement or, as illustrated in the drawing, by means of the single limited group of teeth 15 on a small portion of the periphery of the continuously driven gear 14, at the output of the motor 13, which engage one-sixth of the teeth of the smaller drum drive gear 16 every revolution thereof. Then for every revolution of the motor drive shaft 17, the drum 11 is driven one-sixth of a revolution in the direction designated by the arrow in Fig. 2. Whenever the drum is stopped, a capacitor 18 (shown in phantom in Fig. 2) is supported in a test position or station where its pigtails are in electrical contact with electrodes or test terminals 19 and 20 which are loosely supported from an insulating bar 22 extending between upright members 23 and 24 of a protective cage 25. Collars 30 on the bar adjacent opposite sides of the contactors keep them properly positioned on the drum for engagement with the pigtails. In moving into test position, the pigtails are dragged along the lower surfaces of the electrodes which are sufficiently heavy so that this action cleans the contacting parts to insure good electrical contact therebetween. The electrodes are connected to the electrical test circuit of Fig. 3 through terminals 26. The capacitors 18 are fed to the drum from a track 27 which comprises two parallel inclined members on which the pigtails of the capacitors are supported. The feed track and the terminals 26 have been omitted from Fig. 1 for purposes of clarity.

The sorting means include a deflecting member 28 attached to a chute 29 which, in turn, is pivotally mounted from a brace 32 supported by the top plate 33 of the fixture. In Fig. 1 only a portion of the brace is disclosed to avoid unnecessary confusion in the drawing. In its normal position, as seen in Fig. 2, the deflecting member 28 makes slidable contact with the drum between the retention teeth 12 thereof. Tested capacitors 18 are deflected by means of member 28 into the chute 29 to a reject receptacle 34 in the event the defects are not cleared during the burn-out test. A solenoid 35 having an actuator link 36 attached to the chute 29 permits lifting the deflecting member 28 away from the drum 11, as seen in dashed lines in Fig. 2, so that cleared capacitors 18 may drop directly through an aperture 37 in the bottom of the fixture into a receptacle placed thereunder.

The schematic diagram of Fig. 3 is divided into two main portions, the burn-out test circuit portion 21 and the sorting means control circuit portion 52. In the test circuit portion 21, the capacitor test voltage, which is applied between electrodes 19 and 20, is derived from a direct current power supply 42, which is adjusted to the specified test potential for the capacitors 18 plus a small voltage drop to compensate for the drop in the associated circuitry. This voltage is applied to the capacitor under test through the plate circuit of a multielectrode electron tube such as a tetrode or the pentode 43 shown in drawing. A voltmeter 44 and a condenser 45 are connected in parallel with the electrodes 19 and 20 of the test fixture, the purpose of the capacitor 45 being to provide an initial short surge of current superimposed on the plate current of the tube to burn out short circuiting defects in the capacitor 18 when it first makes contact with the electrodes. The size of the capacitor 45 is selected to provide a larger than normal short circuiting current in the capacitor under test which it can safely withstand without overheating for the momentary discharge period. To initially set up the pentode circuit, a short circuit is placed between the electrodes 19 and 20, and the grid supply 46 is adjusted so that the tube operates in its constant current area and the plate current, flowing through the capacitor 18, is at a prescribed value for burning out defects without overheating and damaging the capacitor. This current value is sufficiently high to burn out normal short circuiting defects remaining in the capacitor 18 after the initial current surge due to the discharge of capacitor 45. For example, for burn-out testing of one microfarad tantalum capacitors which must withstand a test potential of at least 35 volts, this value may be two milliamperes, while the momentary surge discharge current may be several times this value as may be made available with capacitor 45 which, for this case, could be of 10 microfarads size. The test source 42 would be adjusted to a value of about 37 volts so that when the defects are burned out of the capacitor 18, and the current is substantially zero, the voltage drop across the tube 43 will be about two volts and the remaining 35 volts will be across the capacitor 18.

The operating characteristic curve for the pentode is similar to that disclosed in Fig. 4, the constant current value of which is adjusted to two milliamperes (as represented by the portion of the curve to the right of the knee). The non-linear current characteristics of the pentode-type electron tubes such as the 6SF7 make them ideally suited to control and limit the heating effects of the current during the burn-out period when the leakage resistance of the capacitor varies from a very low value to a very high one. So long as the leakage resistance is low, the current in the capacitor may be of a substantial value (i.e., 2 milliamperes) and yet the product of the current squared times the leakage resistance, the heat generating factor, will not be excessive. As the leakage resistance increases, however, the current is reduced rapidly in order to prevent overheating.

When a capacitor 18 is connected between the electrodes 19 and 20, the condenser 45 will discharge through the short circuits therein to provide an initial short current surge therethrough superimposed on the normal plate current of the circuit. Due to the low initial leakage resistance for the capacitor 18, the capacitor will get the benefit of substantially the maximum current to which the pentode circuit has been set. As the capacitor improves (as the defects therein are burned out), its leakage resistance grows larger and excessive heating is prevented by the accompanying reduction in the effective plate voltage of the pentode which drives the pentode to operate below the knee of the curve (Fig. 4) in the region where the current changes rapidly with small changes in plate voltage. As a result, the capacitor under test gradually takes over substantially the entire voltage from the power supply until it reaches the specified test potential.

While the burn-out test circuit 21 utilizes a multielectrode electron tube in order to obtain the required non-linear current response characteristics, it is possible to use other non-linear circuits and circuit element such as varistors and semiconductor diodes for this purpose. These devices must be arranged or biased so that their impedances increase non-linearly with a decreasing potential difference thereover in order that the temperature rise in the capacitors under test will remain within safe limits.

The control circuit 52 for operating the solenoid 35 includes an electron discharge device such as triode 53 having a sensitive, marginal relay 54 in its plate circuit. The grid bias supply 56 for the triode is adjusted to present a negative bias to the grid 55, when the electrodes 19 and 20 are short-circuited, of a value equal to the test voltage prescribed for the capacitors 18 plus the negative bias required to produce a plate current just sufficient for the operation of relay 54. This bias voltage is applied in series with the voltage drop developed across the capacitor under test and the voltage drop across the capacitor 18 is in opposition to the bias of the source 56. Then when the voltage across the capacitor under test reaches the specified value, the triode 53 will conduct sufficiently to operate relay 54 to control the operation of the sorting chute 29 and deflecting member 28. The operated contacts 57 of relay 54 close the energizing circuit for a relay 58 which controls the operation of the control solenoid 35 for the chute. The relay 54 is shunted with a large capacitor 59 to make it slow operating and thereby permit proper actuation of the solenoid 35 to allow the tested capacitor 18 to fall through the aperture 37 in the base of the fixture before the deflecting member 28 is returned by the release of the solenoid 35.

Summarizing the automatic operation of the test set, the motor 13, which is energized through an energizing switch 62 from a source 63, drives the gear 14 to move the drum one-sixth of a revolution every ten seconds so that a pair of the retention teeth 12 engage the pigtails of the lowermost capacitor on the supply track 27 and move it up into friction engagement with the electrodes 19 and 20 in the test station for the test period. The test circuit, as shown in Fig. 3, is operative immediately as the condensers are moved into the test station. During the test period the defects of the capacitors are burned out and, in the event the capacitor clears sufficiently so that prescribed test potential builds up across it, as may be observed by the voltmeter 44, the solenoid 35 will be operated to lift the deflecting member 28. When the gear 14 next drives the drum drive gear 16, the deflecting member 28 will be raised so that the tested capacitor 18 may drop through the aperture 37. On the other hand, in the event the test voltage failed to build up during the prescribed test period, the solenoid 35 will not operate and the tested capacitor will be deflected by the member 28 into the chute 29 and the reject receptacle 34.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A test set circuit for burning out short circuiting defects between the electrodes of capacitors, which comprises, a source potential having first and second sides, impedance means for providing a given constant maximum current with maximum voltage across the impedance means and a non-linearly reduced current with a reduction in voltage across the impedance means and having an input and an output, said input being connected to the first side of the source potential, a first test terminal serially connected to the output of the impedance means for connection to one lead of a capacitor under test, and a second test terminal for connection to the other lead of the capacitor under test, the second terminal being connected to the second side of the source potential, so that a large current is provided when the potential across the capacitor under test is relatively low and a relatively small current is provided when the potential to the capacitor under test is relatively high.

2. A test set according to claim 2 having a capacitor connected across the first and second test terminals for providing a high discharge current through the capacitor under test.

3. A test set for burning out short circuiting defects between the electrodes of capacitors, which comprises, a source potential having first and second sides, impedance means for providing a given constant maximum current with the maximum voltage across the impedance means and a non-linearly reduced current with a reduction in voltage across the impedance means and having an input connected to the first side of the source potential and an output, a first test terminal serially connected to the output of the impedance means for connection to one lead of a capacitor under test, and a second test terminal for connection to the other lead of the capacitor under test, the second terminal being connected to the second side of the source potential so that a large current is provided when the potential across the capacitor under test is relatively low, an electron tube having a control grid means connected to the second test terminal for holding the electron tube below cut-off when the potential across the capacitor under test is relatively low and for permitting conduction through the electron tube when the potential across the capacitor under test is relatively high, and electro-mechanical means connected to the output of the electron tube for diverting the capacitor under test to one position if the electron tube is conducting and for diverting the capacitor under test to a second position if the electron tube is not conducting.

4. A capacitor test and defect burn-out circuit, which comprises, a source of potential having first and second sides, the first side being connectable to a capacitor under test, a pentode-type vacuum tube having a cathode connected to the second side of the potential source, an anode connected to one terminal of a capacitor under test, and biased control grid means for providing a constant high current through the tubes and the capacitor under test when the capacitor under test is internally short circuited and for providing a non-linear sharply decreasing current when the leakage resistance of the capacitor under test increases.

5. A test set for burn-out testing of capacitors which comprises first and second test terminals, means for successively delivering and electrically connecting individual ones of capacitors under test to the test terminals and for maintaining the electrical connection for a prescribed test period, a test circuit including a source of potential having first and second sides, the first side being connectable to the first test terminal, a pentode-type vacuum tube having a cathode connected to the second side of the potential source, an anode connected to the second test terminal, and biased control grid means for providing a constant current through the tube and the capacitor under test when the capacitor under test is internally short circuited and for providing a non-linear sharply decreasing current when the leakage resistance of the capacitor under test increases.

References Cited in the file of this patent
UNITED STATES PATENTS

| | | |
|---|---|---|
| 1,832,948 | Schmidt | Nov. 24, 1931 |
| 2,016,455 | Purdy | Oct. 8, 1935 |
| 2,031,840 | McCarty | Feb. 25, 1936 |
| 2,321,191 | Elmendorf | June 8, 1943 |
| 2,362,691 | Gaiser | Nov. 14, 1944 |
| 2,589,070 | Frisbie et al. | Mar. 11, 1952 |
| 2,736,862 | Tooker | Feb. 28, 1956 |
| 2,771,992 | Artingstall et al. | Nov. 27, 1956 |
| 2,796,986 | Rajchman et al. | June 25, 1957 |